3,337,298
PROCESS FOR PREPARING ALPHA CALCIUM SULFATE SEMI-HYDRATE FROM SYNTHETIC GYPSUMS
Hermann Rüter, Ludwigshafen (Rhine), Pfalz, and Egon Cherdron and Fritz Fässle, Limburgerhof, Pfalz, Germany, assignors to Gebruder Giulini G.m.b.H., Ludwigshafen (Rhine), Germany, a corporation of Germany
No Drawing. Filed May 21, 1963, Ser. No. 282,145
Claims priority, application Germany, May 25, 1962,
G 35,065
8 Claims. (Cl. 23—122)

This invention relates to the manufacture of semi-hydrated gypsums and has as its principal object a process suitable for production of the semihydrate from so-called gypsum mud, a by-product of chemical processes. The manner in which this and other objects are attained according to the invention, will be apparent from the following description.

In the manufacture of the commercial qualities of gypsum, use is made mainly of the so-called normal pressure calcining process in which the gypsum rock is heated in open cookers, resulting in the production, by driving off water, of the beta semihydrate which has a relatively low strength (compressive strength ranging approximately from 50 to 120 kg./cm.$^2$). Where greater strength is required, the alpha semihydrated gypsum can be used. The alpha form is also known as hard forming gypsum, hard polishing gypsum or autoclave gypsum. The latter is made by treating the calcium sulfate dihydrate in an autoclave with steam at greater than atmospheric pressure.

It is also in the prior art to manufacture alpha semi-hydrated gypsum by the treatment of crushed gypsum rock in aqueous suspension in autoclaves, preferably in the presence of crystal structure influencing substances, such as salts of aliphatic polycarboxylic acids or surface-active substances. From this kind of alpha semihydrated gypsum, plaster casts can be made with compressive strengths in excess of 200 kg./cm.$^2$.

Also known is the manufacture of alpha semihydrated gypsum in salt solutions of appropriate concentration, as for example in an aqueous solution of 29% CaCl$_2$ and 1% KCl, at temperatures below the boiling point at atmospheric pressure. Here again, further improvements in quality are achieved by the addition of substances to influence crystallization, such as sulfite waste liquor or surface active substances. In this manner, alpha semi-hydrated gypsums are produced directly from crushed gypsum rock with compressive strengths of about 600 kg./cm.$^2$ If an attempt is made by the above-described methods to produce semihydrated gypsums from synthetic dihydrated calcium sulfate, such as the "gypsum mud" produced as a by-product of the production of phosphoric acid by the wet process from crude phosphate and sulfuric acid, or the gypsum that is produced by the reaction of calcium carbonate with sulfuric acid, semihydrates are produced which have far poorer properties than those made from high-quality gypsum rock by the above-described methods. For this reason it has hitherto been impossible to produce semihydrated gypsum usable for construction purposes from the bothersome waste gypsum produced in many industries.

Now, it has been found that high-quality semihydrated gypsums can be produced from the above-described synthetic gypsums, especially from the gypsum mud produced in the wet process of manufacture of phosphoric acid, by treatment of the calcium sulfate dihydrate in an aqueous phase, at pH between about 1 and 5, preferably between about 2 and 4, according to the conditions of the reaction, and utilizing a continuous or quasi-continuous method of operation, and with the addition of crystallization agents which are substances that influence the crystal structure and/or the speed of crystallization.

The process can be performed in the autoclave, in which case an aqueous suspension of the dihydrated calcium sulfate with appropriate crystallization agents added to influence crystal structure and/or the speed of crystallization is treated at temperatures between 105° and 140° C., preferably at 115° to 120° C., and it can also be performed without pressure by using salt solutions of appropriate concentration, also in the presence of substances which influence crystal structure and/or crystallization speed, as a reaction medium for the transformation to semihydrated gypsum, keeping the temperature very close to the boiling point of the solution, e.g. in the range of 90–110° C.

As it is known from the technical literature, high strengths are achieved in the finished semihydrated gypsum only when the latter exhibits certain crystal structures and a certain minimum crystal size. Whereas, in the manufacture of semihydrated gypsum of high strength from high quality gypsum rock by discontinuous processes, whether in the autoclave or in concentrated salt solutions, it is not at all difficult to achieve the necessary crystal structure and size, even in the absence of substances affecting crystal structure and speed of crystallization, it is not possible to do so with synthetic gypsum. In the case of synthetic gypsum, for the desired crystal structure crystallization agents, which are substances which influence crystal structure and/or speed of crystallization, such as alkylaryl sulfonates or sulfite waste liquor or aluminum sulfate or salts of dicarboxylic acids, should be used; and an appropriate pH range, which lies between 1 and 5 and preferably between 2 and 4, according to the conditions of the reaction and the starting material used, should be maintained. However, even if these requirements are satisfied, the crystals obtained are still too small to achieve satisfactory strengths in the finished plaster. The growth of the crystals to the necessary size is brought about by the continuous or portion-wise feeding of the dihydrated calcium sulfate, advantageously in a thick suspension, to the autoclaves (when the process is performed in an aqueous medium at about 105 to 140° C.) or to the concentrated salt solution at temperatures at about the boiling point. In both cases, semihydrate crystals which have the correct crystal structure but have not yet achieved the necessary size must be present in the solution into which the dihydrated calcium sulfate is fed continuously or portion-wise, preferably in the form of a thick suspension in the reaction medium such crystals having been produced in the manner described above, by the at first discontinuous treatment of a batch of dihydrate with water in the autoclave at 105–140° C., preferably at 115–120° C., or in salt solution at a temperature below the boiling point of this solution. As described above, when these small crystals with the required crystal structure are being produced, the above-stated requirements for the formation of the appropriate crystal structure should be fulfilled, namely, the pH must range between 1 and 5, and preferably between 2 and 4, and substances should be present which influence crystal structure and crystallization speed, such as alkylaryl sulfonate, for example.

Thus, the invention provides for the production of alpha calcium sulfate semihydrate from synthetic gypsum by the steps of providing an aqueous medium having dispersed therein alpha calcium sulfate semihydrate crystals, and adding to this medium synthetic calcium sulfate dihydrate, and maintaining the medium containing the added dihydrate at a temperature and pressure and for a time sufficient for conversion of the said dihydrate to alpha semihydrate. Best results are obtained when a crystallization agent, as described hereinbefore, namely an agent for conversion of calcium sulfate dihydrate to alpha calcium sulfate semihydrate, is maintained present in the medium. When the aqueous medium having dispersed therein alpha calcium sulfate semihydrate is produced from synthetic calcium sulfate dihydrate, the starting medium can be provided by including synthetic calcium sulfate dihydrate of pH about 1–5 in an aqueous medium, and maintaining the resulting mixture at a temperature and pressure and for a time sufficient to convert the dihydrate to the desired alpha calcium sulfate semihydrate crystals. For the production of the alpha calcium sulfate semihydrate of desired crystal size, there can then be added to the medium so produced, synthetic calcium sulfate dihydrate, and this resulting mixture can then be maintained at a temperature and pressure and for a time sufficient for conversion of the added dihydrate to alpha semihydrate.

*Example 1*

2800 g. of moist waste gypsum from the manufacture of phosphoric acid, having a moisture content of 28.5%, are suspended in 2800 cc. of hot water, adjusted with calcium oxide to a pH of 3.5, filtered, and washed with another 2800 cc. of water. After filtering the dihydrate is dried at 45–50° C., resulting in 2000 g. of calcium sulfate dihydrate.

600 cc. of an aqueous solution containing 29% calcium chloride and 1% potassium chloride are added to 400 g. of the dihydrated calcium sulfate. Then 1 g. of sulfite waste liquor is added and the mixture is heated in an agitator vessel to 105–107° C. The transformation from dihydrate to alpha semihydrate takes place after 1½ to 2 hours. Very small crystals result, which are about 2 to 3 times as long as they are wide (compressive strength: maximum 80–100 kg./cm.$^2$).

Into this semihydrate suspension 100 g. of the waste gypsum, treated and dried in the above-described manner and suspended in 150 cc. of the above-described calcium chloride and potassium chloride solution, are fed in portions every 5 minutes. The transformation now takes place very rapidly each time, namely in 1 to 2 minutes. After the addition of a total of 1600 g. of dihydrated calcium sulfate, the suspension is, filtered at 90–100° C. and washed thoroughly with hot water.

The calcium sulfate semihydrate thus produced has compressive strengths of 350 kg./cm.$^2$ at an interspersion of 246 g./100 cm.$^3$.

*Example 2*

200 kg. of moist waste gypsum from the production of phosphoric acid, with a pH of 1.0, are mixed in an agitator vessel with equal parts of water, and adjusted with slaked lime to a pH of 3.5. The paste is then centrifuged and 20 kg. of it (moist from the centrifuge) are mixed with 20 liters of a 0.2% solution of alkylaryl sulfonate. The mixture is heated in a 170-liter autoclave to 116° C. After the recrystallization of the dihydrate to alpha semihydrate, which occurs 20 to 30 minutes after the maximum temperature of 116° C. is reached, 5 kg. of centrifuge-moist gypsum mixed with 5 liter of 0.2% alkylaryl sulfonate solution are added batch-wise every 15 minutes.

The transformation now takes place rapidly, and after addition of only another 20 kg. of centrifuge-moist gypsum, a marked enlargement of the semihydrate crystals can be observed.

In the discontinuous process, the test specimens have a compressive strength running from 100 to 120 kg./cm.$^2$. Compressive strengths of more than 250 kg./cm.$^2$ are achieved by the quasi-continuous process, at a throughput of 100 kg. of centrifuge-moist gypsum.

The alpha calcium sulfate semihydrate taken from the autoclave is washed with water at 80–90° C., and, according to the use to which it will be put, it can then be worked immediately into plaster castings without drying, or it can be dried at 90° C. and bagged.

While the invention has been described with respect to particular embodiments thereof, these are merely representative of the invention.

What is claimed is:

1. In the production of alpha calcium sulfate semihydrate from synthetic gypsum, the steps of:
    (a) providing an aqueous medium of pH about 1–5 having dispersed therein alpha calcium sulfate semihydrate crystals of relatively large size, and containing a crystallization agent for conversion of calcium sulphate dihydrate to alpha calcium sulphate semihydrate;
    (b) gradually adding to said medium synthetic calcium sulfate dihydrate; and
    (c) maintaining said medium during said gradual addition at a temperature and pressure and for a time sufficient for conversion of the said dihydrate to alpha semihydrate and growth of said relatively small size particles to larger size particles.

2. In the production of alpha calcium sulfate semihydrate from synthetic gypsum, the steps:
    (a) providing synthetic calcium sulfate dihydrate in an aqueous medium of pH about 1–5, and containing a crystallization agent for conversion of calcium sulphate dihydrate to alpha calcium sulphate semihydrate, and maintaining said mixture at a temperature and pressure and for a time sufficient to convert the dihydrate to alpha calcium sulfate semihydrate crystals of relatively small size;
    (b) gradually adding to said medium synthetic calcium sulfate dihydrate; and
    (c) maintaining said medium during said gradual addition at a temperature and pressure and for a time sufficient for conversion of said added dihydrate to alpha semihydrate and growth of said relatively small size particles to larger size particles.

3. The method of claim 2, wherein said pH is about 2–4.

4. Method according to claim 2, wherein the aqueous medium in step (a) is maintained at a temperature of about 105°–140° C. and at a pressure providing the aqueous medium in liquid phase for the conversion of the dihydrate to alpha calcium sulfate semihydrate crystals in steps (a) and (c).

5. The method of claim 4, wherein said temperature is in the range of about 115–120° C.

6. The method of claim 2, wherein the aqueous medium is a strong salt solution and the temperature of the medium of steps (a) and (c) is in the range of about 90–110° C.

7. Process according to claim 2, wherein said synthetic gypsum is gypsum mud produced as a by-product of the production of phosphoric acid by the wet process from crude phosphate and sulphuric acid.

8. Process according to claim 2, wherein said crystallization agent is sulfite waste liquor or alkylaryl sulfonate.

References Cited

UNITED STATES PATENTS

| | | | |
|---|---|---|---|
| 1,962,887 | 6/1934 | Ashley et al. | 23—122 |
| 2,197,953 | 4/1940 | Sullivan | 23—122 |
| 2,907,667 | 10/1959 | Johnson | 23—122 |

OSCAR R. VERTIZ, *Primary Examiner.*

EARL C. THOMAS, *Examiner.*